Dec. 8, 1964   R. LÖHR   3,160,419
OIL REGULATING SEALING RING SYSTEM FOR INTERNAL
COMBUSTION ENGINES
Filed Aug. 4, 1960
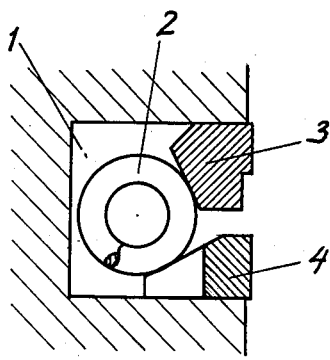
Inventor
RUDOLF LOHR
By Toulmin & Toulmin
Attorneys

United States Patent Office 3,160,419
Patented Dec. 8, 1964

3,160,419
OIL REGULATING SEALING RING SYSTEM FOR INTERNAL COMBUSTION ENGINES
Rudolf Löhr, Burscheid, near Cologne, Germany, assignor to Goetzewerke Friedrich Goetze Aktiengesellschaft, Burscheid, near Cologne, Germany, a corporation of Germany
Filed Aug. 4, 1960, Ser. No. 47,531
Claims priority, application Germany, Sept. 30, 1959, G 28,062
8 Claims. (Cl. 277—141)

This invention is concerned with a sealing ring system particularly for oil regulation in internal combustion engines.

Socalled oil-wiping piston rings are used for oil regulation in internal combustion engines operating in accordance with the four cycle system. These rings are arranged below the sealing-or compression rings proper and wipe the oil from the cylinder wall for the return flow thereof into the crank case through bores, slots or the like formed in the ring and the piston. A customary oil wiping ring is made of cast iron having a continuous peripheral groove forming two webs which are in pressure engagement with the cylinder wall, and having slots milled in the groove through which the oil can flow off. While such rings have proved very serviceable, it was found, especially in the case of thin-walled cylinders, which tend to warp in the presence of fluctuating temperatures, that the two webs are not always in uniform engagement with the cylinder wall. It has for this reason been proposed to tension such cast iron rings radially by means of expander springs.

There are also known piston rings the cylinder-engaging surfaces of which extend obliquely, as seen in cross-sectional view, so that they engage the cylinder wall only edgewise. In order to provide for better sealing, two such rings are used in a normally dimensioned piston groove, each ring having at one flank thereof extensions so as to open a way for the flow of the wiped off oil. Two of such known rings constitute jointly practically a normal oil wiping ring which is by subdivision in radial direction considerably more elastic and more adaptable for its function.

There are also known oil wiping rings consisting of a plurality of parts. Two steel band rings are preferably used, spaced by an intermediate spacing spring which is appropriately shaped to exert in addition to its spacing function a force on the band rings so as to produce a radial tension. A disadvantage of such steel rings is that they exhibit poor gliding properties.

The invention proceeds from the recognition of the fact that it is possible to influence by cross-sectional changes the adaptability or matching and therewith the sealing action of a ring.

The invention accordingly proposes to use, for oil regulation in an internal combustion engine, two rings disposed in a piston groove, such rings being of different cross-sectional configuration and having portions forming surfaces for gliding engagement with the wall of a cylinder, and being by a single expander spring so biased or tensioned radially in the direction of the cylinder wall, that the edge of the glide surface portion of each ring, facing in the direction of the crankcase, exerts against the cylinder wall a greater pressure than is exerted against the cylinder wall by the remaining part of the glide surface portion of the respective ring. The spring may also be formed so that its principal lines of action extend through the glide surface edges of the respective rings.

The glide surface edges of the two rings, which face in the direction of the crankcase, and which exert against the cylinder wall a greater or stronger pressure than is exerted thereon by the remaining parts thereof, are operative to effect wiping off of the oil from the cylinder wall in the corresponding direction, for example, incident to the down stroke of the piston. It is thereby also possible to interrupt the inner edges partially or in different degree. In accordance with another feature of the invention, the gliding surface may be formed step-like; the same also applies to the rearward surface. It is particularly advantageous to form the two inner mutually neighboring sides of the sealing rings at an angle so as to accommodate a circularly extending spring. It is of course within the scope of the invention to provide for the remainder of the rings a desired cross-sectional shape.

The non-symmetrical cross-sectional shape of the rings provides for an optimum oil wiping action. Such rings are moreover particularly effective in one axial direction of motion while leaving the oil film largely undisturbed along the cylinder wall during the motion thereof in opposite direction.

Recesses, for example, slots may be provided along the rear side of the ring, and such slots may be of different depth or width so as to make the ring more flexible.

An embodiment of the invention is shown in the accompanying drawing.

Referring now to the drawing, numeral 1 indicates a groove formed in an upright piston, in which are disposed two rings 3 and 4, serving for oil wiping purposes, such rings being pressed by a circularly extending spring 2 against the wall of a cylinder (not shown). The cross-sectional configuration of the rings 3 and 4 is such that the surface pressure engagement obtaining in the lower part of the oil wiping rings is higher than that obtaining in the upper part thereof. This action is increased by the position of the spring 2. The increased pressure engagement is particularly obtained by the effect of the surfaces of the two rings 3 and 4 lying against the spring 2 and extending at different angles to a base line. The ring 3 is of stepped configuration along its glide surface and the ring 4 has on its rearward side recesses or cutouts formed therein which impart greater radial resiliency thereto.

The rear side surface of each ring is beveled or tapered toward one another outwardly thereof forming an angular configuration. The spring, which has a circular periphery, contacts the beveled sides of each ring at points in the lower portion of each ring whereby the greater outward thrust is in the lower portion of each ring.

Changes may be made within the scope and spirit of the appended claims which define what is believed to be new and desired to have protected by Letters Patent.

I claim:

1. A sealing ring system for disposition in an annular groove in an upright piston of an internal combustion engine for sealing oil from escape from the crankcase, comprising a pair of independently operable sealing rings of a size and configuration to be disposed in such a piston groove and respectively allocated to a flank thereof, said rings respectively having cylindrical glide surfaces for engagement with the cylinder wall surface of such an engine, each ring having a rear beveled side surface, said beveled side surfaces tapering toward one another and outwardly, forming an angular configuration, an expansion spring positioned in said angular configuration, said spring in cross-section having a circular periphery, said spring having points of contact with said respective beveled tapering side surfaces to exert forces outwardly on the respective rings, the horizontal lines of force extending outwardly from the points of contact on each ring passing only through the lower portion of each respective ring and on the crankcase side of the center of gravity of each ring, whereby the edge of the glide surface portion of each ring facing in the direction of the crankcase exerts a greater pressure against the cylindrical wall than the remaining portion of the glide surface of each ring.

2. A sealing ring system according to claim 1, wherein the glide surface of at least one of said sealing rings is at least in part interrupted.

3. A sealing ring system according to claim 1, wherein the glide surface of at least one of said sealing rings is of a stepwise configuration.

4. A sealing ring system according to claim 1, wherein the sides of said sealing rings facing inwardly of said piston groove and forming said angular configuration, extend at different angles for engagement by said spring which extends circularly thereof.

5. A sealing ring system according to claim 1, wherein the sealing ring facing the crank case of the engine is provided with recesses formed therein on the side thereof which faces inwardly of said piston groove.

6. A sealing ring system according to claim 1, wherein the sealing ring facing the crank case of the engine is provided with recesses of different depth formed therein on the side thereof which faces inwardly of said piston groove.

7. A sealing ring system according to claim 1, wherein the sealing ring facing the crank case of the engine is provided with recesses of different width formed therein on the side thereof which faces inwardly of said piston groove.

8. A sealing ring system according to claim 1, wherein the sealing ring facing the crank case of the engine is provided with recesses of different width and depth formed therein on the side thereof which faces inwardly of said piston groove.

References Cited by the Examiner
UNITED STATES PATENTS

| | | | |
|---|---|---|---|
| 1,251,743 | 1/18 | Bosart | 309—25 |
| 1,361,393 | 12/20 | Marshall | 309—25 |
| 1,426,072 | 8/22 | Hanson | 277—145 XR |
| 2,229,578 | 1/41 | Malpas | 309—44 |
| 2,231,801 | 2/41 | Cords | 277—139 |
| 2,579,698 | 12/51 | Phillips | 277—139 |

EDWARD V. BENHAM, *Primary Examiner.*

RALPH H. BRAUNER, WALTER A. SCHEEL, SAMUEL ROTHBERG, *Examiners.*